United States Patent [19]

Drent et al.

[11] Patent Number: 5,373,071
[45] Date of Patent: Dec. 13, 1994

[54] POLYMERIZATION OF ACETYLENES

[75] Inventors: Eit Drent; Dennis H. L. Pello, both of Amsterdam, Netherlands

[73] Assignee: Shell Oil Company, Houston, Tex.

[21] Appl. No.: 77,483

[22] Filed: Jun. 14, 1993

[30] Foreign Application Priority Data

Jun. 23, 1992 [EP] European Pat. Off. ......... 92201847.8

[51] Int. Cl.$^5$ .................. C08F 4/80; C08F 138/00
[52] U.S. Cl. .................................. 526/93; 526/145; 526/146; 526/140; 526/142; 526/135; 526/165; 526/285
[58] Field of Search ............... 526/145, 146, 140, 142, 526/285, 93, 135, 165

[56] References Cited

U.S. PATENT DOCUMENTS 3,117,952  1/1964  Meriwether ............... 526/145 X
3,883,570  5/1975  Trofiomenko ............... 260/429

FOREIGN PATENT DOCUMENTS 59-089310  5/1984  Japan .

Primary Examiner—Mark Nagumo

[57] ABSTRACT

A process for the polymerization of actylenically unsaturated compounds by contacting the monomer(s) under polymerization conditions with a catalyst system comprising:

a) a source of cations of one or more Group VIII metals;

b) a bidentate ligand containing phosphorus, arsenic and/or antimony; and c) a source of anions.

24 Claims, No Drawings

POLYMERIZATION OF ACETYLENES

FIELD OF THE INVENTION

This invention relates to a process for the polymerization of acetylenically unsaturated compounds.

BACKGROUND OF THE INVENTION

Acetylenes can be polymerized by contacting an acetylenically unsaturated compound with a catalyst.

According to U.S. Pat. No. 3,883,570 acetylene is polymerized by heating, under autogenic pressure, the monomer, a bis(diethyl-aminomethyl)-1,2-phenylenedipalladium compound as catalyst and o-dichlorobenzene as solvent, for 8 hours at 200° C.

The polymerization of aromatic compounds containing at least one ethynylgroup as substituent is disclosed in JP 59089310-A. The catalyst consists of a palladium compound, a triorganophosphine, a cuprous salt and an organic amine.

However, it would be desirable to provide a process for the polymerization of various acetylenically unsaturated compounds in the presence of a catalyst which allows the use of relatively mild reaction conditions.

It is therefore an object of the present invention to provide an improved process to polymerize acetylenically unsaturated compounds.

SUMMARY OF THE INVENTION

According to the invention, a process for the polymerization of at least one acetylenically unsaturated compound is provided, comprising contacting said acetylenically unsaturated compound with a catalyst system produced by combining a mixture comprising:

(a) a source of cations of at least one Group VIII metal;

(b) a bidentate ligand comprising phosphorus, arsenic and/or antimony; and (c) a source of anions.

DETAILED DESCRIPTION OF THE INVENTION

It has now been found that improved results are achieved by using a catalyst system based on specific bidentate ligands. The invention relates to a process for polymerizing acetylenically unsaturated compounds by contacting the monomers (acetylenically unsaturated compounds) under polymerization conditions with a catalyst system obtainable by combining a) a source of cations of one or more Group VIII metals (Periodic Table);

b) a bidentate ligand, containing phosphorus, arsenic and/or antimony; and c) a source of anions.

As source of cations of Group VIII metals on which the catalyst system of the invention is based, conveniently a salt of one or more Group VIII metals is used. Preferred Group VIII metals are palladium, rhodium, ruthenium and nickel. Palladium is in particular preferred. If desired catalysts may be used containing cations of more than one Group VIII metal, e.g. cations of palladium and rhodium.

Suitable salts of Group VIII metals are mineral salts, such as for examples sulfates, nitrates and phosphates. In view of their corrosivity, halides are not recommended. Further examples of suitable salts are salts of sulfonic acids, such as methane sulfonic acid, trifluoro methanesulfonic acid and p-toluene sulfonic acid and salts of carboxylic acids, such as acetic acid, halo acetic acids such as for example trifluoro- and trichloroacetic acid, oxalic acid and citric acid.

As source of cations of Group VIII metals the metals may be in their elemental form or in a zero-valent state, e.g. in complex form with carbon monoxide. Preferably these sources are applied in combination with a protonic acid such as sulfuric acid or nitric acid.

It has been found that catalyst systems based on bidentate ligands exhibit a significantly higher activity than catalysts in which only monodentate ligands occur. Furthermore, catalysts having ligands containing phosphorus, arsenic and/or antimony atoms, gives better results than catalysts based on ligands containing other coordinating atoms such as nitrogen or sulfur atoms.

Suitable catalyst systems of the invention accordingly contain bidentate ligands containing at least two atoms selected from phosphorus, arsenic and antimony atoms coordinated with a Group VIII metal. Preferably, ligands are selected, which contains two arsenic, two antimony or, in particular, two phosphorus atoms.

In addition ligands may contain one or more other atoms capable of coordinating with the Group VIII metal, e.g. one or more further phosphorus atoms, are not precluded.

A particular preferred category of bidentate ligands may be indicated by the general formula $$R^1R^2M^1RM^2R^3R^4 \qquad (I)$$

wherein $M^1$ and $M^2$ are different or, preferably, the same atoms selected from phosphorus, arsenic and antimony, R is a divalent organic bridging group containing from 1 to 10 atoms in the bridge and $R^1, R^2, R^3$ and $R^4$ each represent independently a substituted or non-substituted hydrocarbyl group.

The divalent organic bridging group R preferably contains from 2 to 6, more preferably from 2 to 4 atoms in the bridge, at least 2 of which are carbon atoms. Accordingly, in the event only two bridging atoms are present, both bridging atoms are carbon atoms. If more bridging atoms are present, preferably at least the two terminal bridging atoms are carbon atoms whereas the remaining bridging atom(s) may also be carbon atoms or hetero atoms, such as oxygen or silicon atoms, with the proviso that in the bridge two carbon atoms are adjacent to each hetero atom.

Preferable examples of R include —CH$_2$—CH$_2$—, —CH$_2$—CH$_2$—CH$_2$—, —CH$_2$—O—CH$_2$—O—CH$_2$—, —CH$_2$—CH$_2$—CH$_2$—CH$_2$— and —CH$_2$—Si(CH$_3$)$_2$—CH$_2$—. Most preferably R represents a group —CH$_2$—CH$_2$—CH$_2$—.

The substituted or non-substituted hydrocarbyl groups in formula (I), represented by $R^1$, $R^2$, $R^3$ and $R^4$ may be aliphatic, cycloaliphatic or aromatic.

Preferably $R^1$, $R^2$, $R^3$ and $R^4$ represent the same or different substituted or non-substituted aliphatic groups having from 1 to 10 carbon atoms. $R^1$ and $R^2$ and/or $R^3$ and $R^4$ may also together form a divalent aliphatic group, thus forming together with $M^1$ or $M^2$, respectively, a cyclic structure. The aliphatic groups represented by $R^1$, $R^2, R^3$ and/or $R^4$ may be branched or have straight chains.

Preferable examples include methyl, ethyl, propyl, isopropyl, n-butyl, sec.butyl, tertiary butyl, pentyl, n-hexyl, neohexyl, cyclopentyl and octyl groups. Tertiary alkyl groups having from 4 to 10 carbon atoms in particular tertiary butyl groups, are particularly preferred.

As indicated above, in formula (I) $R^1, R^2, R^3$ and/or $R^4$ may represent a substituted hydrocarbyl group. Suitable substituents which do not substantially impair the catalytic activity of the catalyst system may be selected from halogen atoms, such as chlorine and bromine atoms, alkoxy groups, such as methoxy and ethoxy groups, cyano groups, amino-, monoalkyl- and dialkylamino groups.

The source of anions, participating in the catalyst system of the invention may be a source of OH− groups, such as water, a source of $(OR^5)^-$ ions wherein $R^5$ represents an alkyl group, such as an alkanol, preferably having from 1 to 8 carbon atoms such as for example methanol, ethanol or isopropanol, or a source of

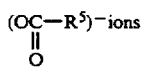

such as a carboxylic acid, such as for example acetic acid or propionic acid. A preferred source of anions is formed by the acids from which the abovementioned Group VIII metal salts are derived. Sulfonic acids such as methane sulfonic acid and trifluoromethanesulfonic acid are in particular recommended sources of anions. Very suitable are in general acids having a pKa of less than about 6, in particular of less than about 4. Acids having a pKa of less than about 2 are most preferred.

Another suitable source of anions is formed by a salt of any of the aforesaid acids, in particular salts of non-noble transition metals, such as copper, chromium and tin.

The amount of catalyst used in the process of the invention is not critical and may vary between wide limits. Conveniently the amount of Group VIII metal in the catalyst is within the range of about $10^{-7}$ to about $10^{-1}$ gram atom metal per mole of acetylenically unsaturated compound, in particular in the range of about $10^{-6}$ to about $10^{-2}$ on the same basis.

The amount of bidentate ligand is preferably from about 0.5 to about 10 moles of ligand per gram atom of Group VIII metal, although if desired lower or higher amounts may be used. More preferably, the amount of bidentate ligand is from about 1 to about 4 moles of ligand per gram atom of metal.

The amount of moles of anions is preferably in excess of the amount of gram atoms of Group VIII metal. Advantageously the amount of moles of anions is from about 1 to about 100, preferably from about 2 to about 50 per gram atom of metal. It will be appreciated that if the Group VIII metal salt is derived from a relatively weak acid, this salt, when combined with a source of anions comprising a relatively strong acid may generate a metal salt of the strong acid with the Group VIII metal and a weak acid.

The catalyst system used in the present process is conveniently prepared in a separate step, before the acetylenically unsaturated monomers are added. Preferably the catalyst system is formed in the liquid phase, e.g. by dissolving a salt of a Group VIII metal in a suitable solvent, subsequently adding the other catalyst components or precursors thereof. Suitable solvents include alcohols such as methanol, ethanol, isopropanol, sec. butanol and ethyleneglycol, ketones such as acetone and methylethylketone, ethers such as dimethylether, diethylether, diethyleneglycoldimethylether (diglyme) and esters such as methylpropionate and ethylacetate. In the event that the monomer under ambient conditions is in the liquid state, this monomer may be used as solvent as well.

Further examples of suitable solvents are acetonitrile, N-methylpyrrolidone and dimethylsulfoxide. Mixtures of solvents may also be applied, if so desired.

The acetylenically unsaturated compounds to be polymerized with the process of the invention may be represented by the formula Y—C≡C—X, wherein X and Y each independently represent a hydrogen atom or an optionally substituted hydrocarbyl group. The substituted hydrocarbyl group can be any hydrocarbyl group substituted with inert substitutent(s). For example, hydrocarbyl groups can be substituted with a hydroxyl (—OH) group.

Preferred monomers are represented by the formula HC≡C—X wherein X has the aforesaid meaning.

Examples of suitable monomers are acetylene, propyne, phenyl-acetylene, 3-hydroxypropyne-1 (propargyl alcohol), 4-hydroxybutyne-1, p-tolylacetylene, 1-butyne and p-diethynylbenzene. Mixtures of two or more monomers may also be used, in which case copolymers are formed.

Preferred monomers are acetylene, phenylacetylene, isopropenylacetylene and 3-hydroxypropyne-1.

The process of the invention is conveniently carried out at moderate temperature and pressure conditions. Suitable reaction temperatures are generally within the range of about 0° to about 180° C., preferably within the range of about 0° to about 150° C. In many cases ambient temperatures suffice for achieving acceptable reaction rates.

Suitable reaction pressures are generally within the range of about 0.1 to about 25 bar, preferably within the range of about 0.1 to about 20 bar. Autogenic pressures are most preferred. If desired, the polymerization may be carried out in the additional presence of a solvent. Suitable solvents are, in particular, the solvents mentioned above in connection with the preparation of the catalyst system.

The polymers prepared in the process of the invention exhibit electrically conductive properties. Their conductivity may be enhanced or counteracted by addition of appropriate electron acceptors, such as arsenic pentafluoride or antimonypentafluoride, or of appropriate electron donors such as alkali metals, for example lithium or sodium.

The polymers can be made in the form of fibers or thin films and may find use in the manufacture of, inter alia, conductors, semi-conductors or insulating materials.

The invention is illustrated by the following, non-limiting examples:

EXAMPLE 1

A catalyst solution was made by dissolving 0.1 mmol palladiumacetate, 0.3 mmol 1,3-bis-(di-tert.butylphosphino)/propane and 0.25 mmol methane sulfonic acid in 10 ml methanol, under nitrogen in a glove box.

A 125 ml glass reactor was charged with 50 ml methanol and 15 ml phenylacetylene. At room temperature (ca.22° C.) 1 ml of the aforesaid catalyst solution was injected in the bottom part of the reactor under a nitrogen blanket. The temperature of the reactor contents rapidly increased to 50°–60° C. and instantaneously precipitation of polymer occurred. After about 5 minutes 12 gram of orange-yellow product had been formed. $^{13}$C NMR analysis of a sample, dissolved in chloroform, showed that the product consisted of polyphenylacetylene.

The calculated reaction rate amounted to more than 100,000 gram polymer per gram palladium and per hour.

EXAMPLE 2

The experiment described in Example 1 was repeated, whereby as catalyst 1 ml of a solution of 0.1 mmol palladiumacetate and 0.3 mmol 1,3-bis-(di-tert.butylphosphino)propane in 10 ml methanol was used. Analysis of the product showed that polyphenylacetylene had been formed, the reaction rate being ca.4000 gram of polymer per gram palladium and per hour.

EXAMPLE 3

In the manner as described in Example 1, an experiment was carried out, whereby as catalyst 1 ml. of a solution of 0.1 mmol palladiumacetate, 0.3 mmol 1,3 bis-(di-tert.butylphosphino) propane and 0.25 mmol trifluoromethanesulfonic acid in 10 ml methanol was used. The temperature rapidly increased to 60° C.

Analysis showed that polyphenylacetylene had been formed, the reaction rate being more than 100,000 gram of polymer per gram palladium and per hour.

EXAMPLE A (FOR COMPARISON ONLY)

The experiment as described in Example 1 was repeated, whereby as catalyst a solution of 0.1 mmol palladium acetate, 0.3 mmol tricyclohexylphosphine and 0.25 mmol trifluoromethanesulfonic acid in 10 ml methanol was used. Subsequently, three successive injections were made with 1 ml of catalyst solution, but no polymer formation was observed.

EXAMPLE B (FOR COMPARISON ONLY)

The experiment as described in Example 1 was repeated, whereby as catalyst 1 ml was used of a solution of 0.1 mmol palladiumacetate, 0.6 mmol tri-tert.butylphosphine and 0.25 mmol trifluoromethane-sulfonic acid in 10 ml methanol. No polymer formation occurred.

EXAMPLE 4

In the manner as described in Example 1, an experiment was carried out whereby as catalyst 1 ml was used of a solution of 0.1 mmol palladiumacetate, 0.3 mmol 1,3-bis-(di-isopropylphosphino)propane and 0.25 mmol methane sulfonic acid. At 60° C. polyphenylacetylene was formed at a rate of 250 gram polymer per gram palladium and per hour.

EXAMPLES 5-8

In the manner as described in Example 1, four experiments were carried out whereby in the catalyst system different Group VIII metal compounds were present. Four catalyst solutions were prepared containing 0.1 mmol nickelacetate, 0.1 mmol rhodium (dicarbonyl) acetylacetonate, 0.1 mmol platinum diacetylacetonate and 0.1 mmol ruthenium-di-acetylacetonate, respectively, combined with 0.25 mmol 1,3-bis (di-tert-butylphosphino)propane and 0.25 mmol methanesulfonic acid in 10 ml methanol. 1 ml of each of these solutions was added to 10 ml phenylacetylene in 50 ml methanol. After 24 hours at room temperature, in each case a small amount of polymer had formed.

EXAMPLE 9

An autoclave of 300 ml (Hastelloy-C) was charged with 40 ml 10 methanol and 15 ml propyne. Subsequently 10 ml. of a solution of 0.1 mmol palladium acetate, 0.3 mmol 1,3-bis-(tert.butylphosphino)propane and 0.25 mmol methane sulfonic acid in methanol was added.

A rapid polymerization occurred instantaneously, as was indicated by an exotherm of 70° C. In less than 2 hours 8 gram of polypropyne had been formed. $^{13}$C NMR analysis of a sample, dissolved in chloroform confirmed the structure

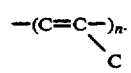

The rate of polymerization was about 50000 gram polymer per gram 20 palladium and per hour.

EXAMPLE 10

In the manner as described in Example 1, an experiment was carried out, whereby instead of 15 ml. phenylacetylene, 10 ml. propargylalcohol was used. On injection of 1 ml of the catalyst solution, the temperature rose to 40° C. and instantaneous precipitation of polymer occurred. GLC analysis of residual solution showed that the conversion of propargylalcohol was 30% (in 0.5 hours). By two further injections of 1 ml of catalyst solution the conversion of propargylalcohol increased to 60%. 5 gram polypropargylalcohol was filtered off and dried at 70° C. in a vacuum oven. The product is insoluble in methanol and dissolves slowly in NMP at 70° C. The product was characterized by $^{13}$C solid state NMR analysis.

EXAMPLE 11

In the manner as described in Example 10, an experiment was carried out, whereby instead of propargylalcohol, 10 ml of 4-hydroxy butyne-1 was used. Three successive injections with 1 ml of catalyst solution were made, with 0.5 hour intervals. The isotherm was 40° C.. Upon evaporating methanol, 7 grams of polybutynol were recovered. The product which is soluble in methanol has the structure —(C=C(CH$_2$—CH$_2$OH)—)$_n$.

EXAMPLE 12

A catalyst solution was prepared by dissolving 0.01 mmol palladium acetate, 0.03 mmol 1,3-bis(di-tert.butylphosphino)propane and 0.025 mmol methane sulfonic acid in 50 ml N-methylpyrrolidone.(NMP).

Acetylene was bubbled through the solution and after a reaction period of 1.5 hours, 3.5 gram polyacetylene was filtered off.

EXAMPLE 13

In the manner as described in Example 1, an experiment was carried out whereby instead of phenylacetylene, 5 ml isopropenylacetylene and instead of methanol, 50 ml of toluene as reaction solvent was used.

Two successive injections with 1 ml of catalyst solution were made. After a total reaction time of 1.5 hour 3.5 gram of polyisopropenyl acetylene was filtered off.

EXAMPLE 14

A catalyst solution was prepared by dissolving 0.01 mmol palladiumacetate, 0.03 mmol 1,3-bis(di-tert.butylphosphino)propane and 0.025 mmol methane sulfonic acid in 50 ml N-methylpyrrolidone (NMP).

To this solution 2 ml of propargylalcohol was added and acetylene was bubbled through the solution for 1 hour. The temperature increased to 40° C. during the polymerization which was stopped by discontinuing the supply of acetylene.

During the polymerization the viscosity of the mixture increased but for about 1 hour the dark red polymer remained dissolved in NMP. After about 2 to 3 hours a gel developed. $^{13}$C NMR analysis (MAS solid state) indicates that a copolymer of propargylalcohol and acetylene had been formed.

EXAMPLE 15

In the manner as described in Example 1, a catalyst solution was prepared whereby instead of methane sulfonic acid, 0.25 mmol trifluoromethanesulfonic acid was used.

1 ml of catalyst solution was injected into a mixture of 10 ml phenylacetylene and 2.5 ml. propargylalcohol.

A rapid polymerization reaction occurred, producing an insoluble polymer at a rate of about 10,000 gram polymer per gram palladium and per hour.

The polymer has a melting point of 220° C. and by $^{13}$C NMR analysis was indicated to be a copolymer of phenylacetylene and propargylalcohol.

What is claimed is:

1. A process for the polymerization of acetylenically unsaturated compounds by contacting at least one acetylenically unsaturated compound under polymerization conditions with a catalyst system comprising:
   a) a source of cations of at least one Group VIII metal selected from the group consisting of cations of palladium, rhodium, or mixtures thereof;
   b) a bidentate ligand comprising phosphorus, arsenic and/or antimony; and
   c) a source of anions.

2. The process of claim 1 wherein the catalyst system comprises palladium cations.

3. The process of claim 1 wherein the bidentate ligand is of the formula

$$R^1R^2M^1RM^2R^3R^4 \qquad (I)$$

wherein each of $M^1$ and $M^2$ are independently a phosphorus, arsenic or antimony atom, each of $R^1,R^2,R^3$ and $R^4$ are independently a substituted or non-substituted hydrocarbyl group and R is a bivalent organic bridging group having from 2 to 6 atoms in the bridge.

4. The process of claim 3 wherein $M^1$ and $M^2$ are both phosphorus atoms.

5. The process of claim 3 wherein $R^1$, $R^2$, $R^3$ and $R^4$ are the same or different substituted or non-substituted aliphatic groups having form 1 to 10 carbon atoms.

6. The process of claim 3 wherein at least one of $R^1,R^2$, $R^3$ and $R^4$ is a tertiary alkyl group having from 4 to 10 carbon atoms.

7. The process of claim 3 wherein at least one of $R^1,R^2$, $R^3$ and $R^4$ is a tertiary butyl group.

8. The process of claim 3 wherein R is a bivalent organic bridging group containing from 2 to 4 atoms in the bridge at least 2 of which are carbon atoms.

9. The process of claim 8 wherein R is a group —CH$_2$—CH$_2$—CH$_2$—.

10. The process of claim 1 wherein the source of anions is selected from the group consisting of water, one or more alkanols, one or more carboxylic acids, and mixtures thereof.

11. The process of claim 10 wherein the source of anions is an alkanol having from 1 to 8 carbon atoms.

12. The process of claim 10 wherein the source of anions is a carboxylic acid having a pKa of less than about 6.

13. The process of claim 12 wherein the source of anions is a carboxylic acid having a pKa of less than about 2.

14. The process of claim 1 wherein the acetylenically unsaturated compound is of the formula HC≡C—X wherein X represents hydrogen or a substituted or non-substituted hydrocarbyl group.

15. The process of claim 14 wherein X is hydrogen.

16. The process of claim 14 wherein X is a phenyl group.

17. The process of claim 14 wherein X is a hydroxyl-substituted hydrocarbyl group.

18. The process of claim 14 wherein X is an isopropenyl, a hydroxymethyl or a 1-hydroxyethyl group.

19. The process of claim 1 wherein the polymerization is carried out at a temperature within the range of about 0° to about 150° C.

20. The process of claim 19 wherein the polymerization is carried out at ambient temperature.

21. The process of claim 1 wherein the polymerization is carried out at a pressure within the range of about 0.1 to about 20 bar.

22. The process of claim 1 wherein the polymerization is carried out in the presence of a solvent.

23. The process of claim 22 wherein the solvent is N-methylpyrrolidone.

24. The process of claim 22 wherein the solvent is methanol.

* * * * *